United States Patent [19]

Withrington et al.

[11] 4,218,111
[45] Aug. 19, 1980

[54] HOLOGRAPHIC HEAD-UP DISPLAYS

[75] Inventors: Roger J. Withrington, Los Angeles; Lacy G. Cook, Hawthorne; Helene H. Jones, Los Angeles, all of Calif.

[73] Assignee: Hughes Aircraft Company, Culver City, Calif.

[21] Appl. No.: 923,119

[22] Filed: Jul. 10, 1978

[51] Int. Cl.$^2$ .............................................. G02B 27/00
[52] U.S. Cl. .................................. 350/3.72; 35/12 N; 340/705; 350/3.65; 350/193; 350/215
[58] Field of Search ...................... 350/193, 215, 3.65, 350/3.70, 3.72, 162 ZP, 174; 35/12 N; 340/705

[56] References Cited

U.S. PATENT DOCUMENTS

| | | | |
|---|---|---|---|
| 3,378,326 | 4/1968 | Alvarez | 350/193 X |
| 3,533,104 | 10/1970 | Habegger et al. | 35/12 N UX |
| 3,737,212 | 6/1973 | Antonson et al. | 350/174 |
| 3,807,829 | 4/1974 | Close | 350/3.72 |
| 3,885,095 | 5/1975 | Wolfson et al. | 358/250 |
| 3,915,548 | 10/1975 | Opittek et al. | 350/3.72 |
| 3,940,204 | 2/1976 | Withrington | 350/3.72 |
| 3,945,716 | 3/1976 | Kinder | 350/174 |
| 3,949,490 | 4/1976 | Derderian et al. | 35/12 N |
| 4,018,512 | 4/1977 | Sakai | 350/215 |

OTHER PUBLICATIONS

"Head-Up Display Concept Under Development," *Aviation Week & Space Technology*, May 16, 1977, pp. 55-56.

*Primary Examiner*—John K. Corbin
*Assistant Examiner*—John D. Lee
*Attorney, Agent, or Firm*—Allen A. Dicke, Jr.; W. H. MacAllister

[57] ABSTRACT

There is disclosed an integrated optical design of head-up displays suitable for use in aircraft cockpits and the like. The display system is comprised of a holographic optical element used as the combiner for presenting a direct view of the exterior on which are superimposed image signals generated by a source device such as a cathode ray tube and transmitted to the combiner through an optical system including a relay lens containing tilted and decentered optical elements to compensate for the aberration present in the holographic optical element. There are further disclosed four relay lens design forms particularly suited for use in the design of such holographic head-up displays. The disclosure includes integrated designs in which (a) the holographic element may or may not be constructed with aberrated wavefront and (b) a beam splitter is incorporated for insertion of a stand-by sight, possibly also being tilted for the correction of aberrations.

1 Claim, 8 Drawing Figures

HOLOGRAPHIC HEAD-UP DISPLAYS

BACKGROUND OF THE INVENTION

The state of the art in head-up display (HUD) systems for aircraft cockpits is illustrated by such patents as U.S. Pat. No. 3,885,095 issued to G. Wolfson et al on May 20, 1975, U.S. Pat. No. 3,915,548 issued to E. W. Opittek et al on Oct. 28, 1975, and U.S. Pat. No. 3,940,204 issued to R. J. Withrington of Feb. 24, 1976.

In recent years there has been a significant advance in the state of the art of components and techniques applicable to the pilot's display unit of a head-up display system. These advances include new equivalent source means for generating images through the use of liquid crystal or scanned laser techniques as well as improvements in the traditional cathode ray tube (CRT). Also, new techniques for designing and building the collimating optical system have been devised. The advent of diffraction optics technology has opened the way for more efficient wider field of view displays.

The major use of a HUD in a high performance aircraft is to improve the pilot's capability for effective target acquisition and weapon delivery by providing him with a display of information essential for the performance of these tasks while allowing him to fly in a head-up mode, that is, seeing out of the cockpit. In order to be effective, the requirements established for any HUD system must consider the type and placement of information to be displayed as well as physical considerations such as field of view, viewability and installation. A larger field of view will significantly improve a HUD's utility for both target acquisition and weapon delivery. For target acquistion, the desirable maximum azimuth field of view is about 30 degrees while for weapon delivery an improved elevation field of view is desirable. Reasonable total elevation fields of view are 20 to 25 degrees. There may, however, remain physical restrictions due to cockpit arrangment which limit the available field of view.

It is an object of the present invention to provide an optical system capable of providing at least these desirable fields of view.

Improving the instantaneous field of view over its present narrow limits (the traditional weak point of existing HUD designs) also provides the ability to de-clutter the display—an important aspect in any improved HUD.

Examination of possible approaches to the design of advanced HUDs has pointed to HUDs which utilize more sophisticated optical systems than the conventional refractive lens approach. Possibilities include the diffraction optics HUD, the reflective HUD, and the PERI-HUD all of which have unique optical systems and also increased field capabilties. The reflective HUD exhibits a wider field of view than the refractive, but offers no improvement in symbol brightness. The PERI-HUD offers wider field of view but presents a monocular image of the outside world by virtue of its combiner design. The diffraction optics HUD is capable of an even wider field of view than the reflective HUD and also can improve the symbol brightness and viewability with which the pilot sees the outside world. This diffraction optics HUD is described generally in the above patents to Opittek and to Withrington. It uses a holographic optical element (HOE) combiner which both efficiently reflects a generated image emanating from a narrow bandwidth source such as a CRT and provides a higher degree of transmission through the combiner of the light coming from the outside world.

The use of a diffraction optical element for the combiner is a relatively new concept that has developed in the past few years. It has evolved from holographic recording technology; hence the name holographic optical element (HOE). It involves the design and application of lenses based on diffraction principles rather than refraction or reflection as in conventional optics. When utilized in conjunction with conventional lenses, optical systems can be designed with characteristics not otherwise achievable. In the case of the HUD, this provides the designers with the ability to design highly efficient, wide field of view systems, with configurations that are more compatible with cockpit geometry considerations than can be achieved by conventional optics alone. Such systems, however, introduce unique problems of their own.

The present invention enables the large aberrations present in the holographic optical element to be better corrected than has previously been possible. The relay lens design forms disclosed and claimed herein are capable of operating with relay lens fields of view of 40 to 55 degrees or more, while being short and extremely fast (F/0.75 to F/1.5). These design forms permit the design of wide field of view (FOV) holographic head-up displays in which the hologram focal length is short so that the optical system is compact and can be packaged within the restricted space of an aircraft cockpit. Previous HUD designs (a) did not include corrections of aberrations by tilting relay lens elements, and (b) were limited to relay design forms not capable of the wide FOVs and low F-numbers required for improved display configurations.

SUMMARY OF THE INVENTION

In a preferred embodiment, the present invention consists of a 63 millimeter cathode ray tube image source, relay optics and a diffraction optics combining glass. The combiner not only functions as a beam splitter, but also as a collimating element for the image emanating from the CRT. The combiner consists of a diffraction optics element sandwiched between two spherical glass shells. The wavelength of light which is diffracted with highest efficiency by the combiner coincides with the narrow band P-43 phosphor emission at 543 nanometers.

The display image at the CRT face or object surface is relayed via a sophisticated multi-element relay lens system to an intermediate image plane at the focus of the combining element. The relay lens not only reconstructs the image at a convenient location for the combiner, but also forms a curved, tilted, and aberrated image surface in order to compensate for some aberrations introduced by the combiner. This is achieved not only by the refractive lens designs of the relay lens system but also by providing tilted and decentered optical elements in that system to compensate for the aberrations present in the holographic optical element combiner. The CRT can also be tilted to provide the necessary image tilt. The result is an optically corrected image of the CRT's symbology presented to the operator superimposed upon his view of the outside world. Various detailed embodiments of relay lens system designs may be used, but each is characterized in that a majority of its optical elements are on the optical image signal source side of the aperture stop of the system and that the optical elements comprise a negative power element close to the aperture stop for control of the Petzval sum, the surface facing the intermediate image being sharply curved to avoid excessively high angles of incidence which otherwise would occur due to the wide field of view, and a positive lens group of three or more positive elements which contain most of the optical power.

BRIEF DESCRIPTION OF THE DRAWINGS

These and other objects, features and advantages of the invention will be more fully apparent to those skilled in the art from the detailed description below taken in conjunction with the accompanying drawings wherein:

FIG. 5 is the starting (rotationally symmetric) version from which the system shown in FIGS. 1, 2 and 3 is derived.

DETAILED DESCRIPION OF THE INVENTION

Figure 1:
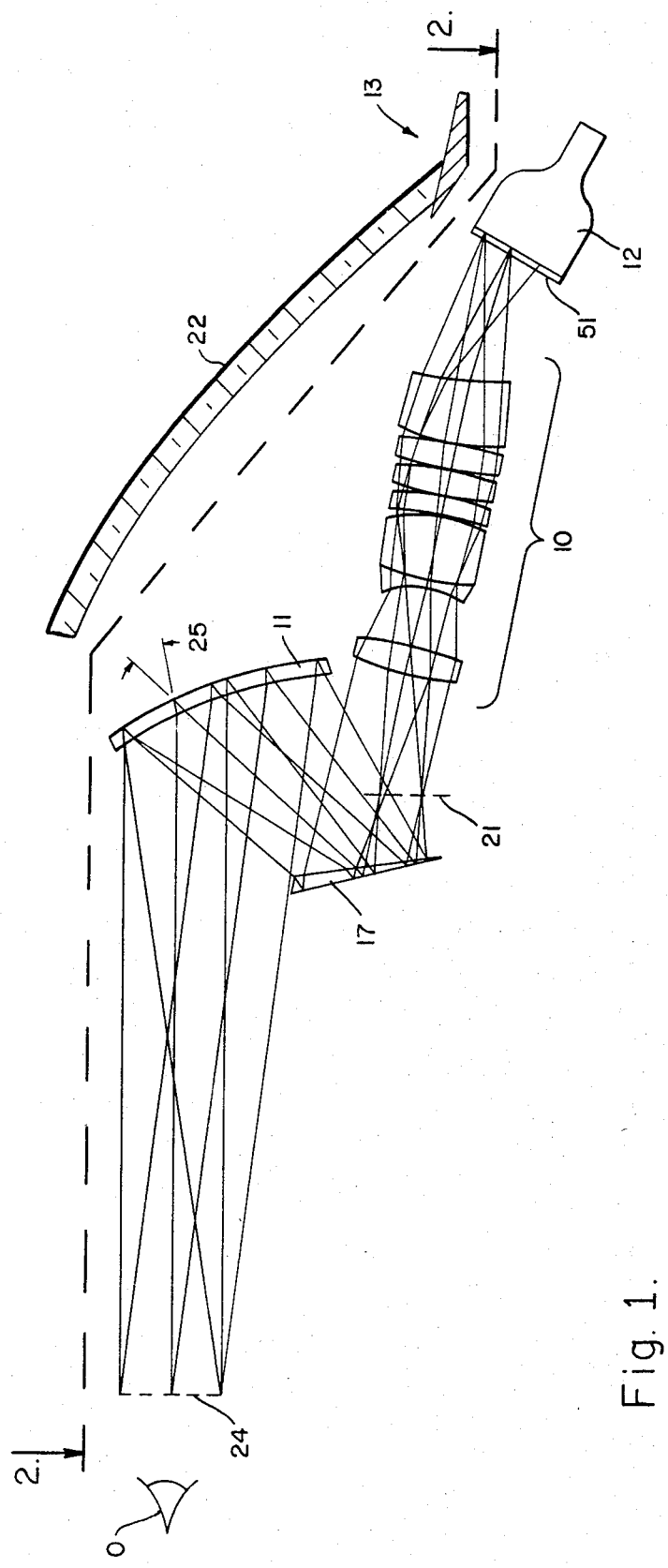
FIG. 1 is an optical schematic view taken in the plane of a vertical section through the HUD display system.

The optics for a preferred example of a holographic head-up display system designed to cover a wide field of view is shown by the way of example in the schematic diagrams of FIGS. 1, 2, 3, 5 and 8. The system shown therein has a field of view of 22 degrees vertical by 35 degrees horizontal and primarily consists of a relay lens system 10 and a holographic optical element 11 which is both the combiner and collimator. The relay lens images an object surface such as the rear face 51 of a cathode ray tube 12 at the focal surface 21 of the holographic optical element 11. A folding prism 17 having a reflective rear surface is conveniently used. The holographic element subsequently forms a high quality image of the object surface which image is superimposed on the outside world as seen by the pilot observer, O, looking through the combiner 11 and on out through the aircraft canopy 22 normally included in the airplane 13. The display can be seen by the pilot when looking through the exit pupil 24 of the display system. For good viewing conditions the exit pupil must be large and is typically located from 20 to 30 inches from the combiner. This is because the relay lens pupil defined by aperture stop 16 is imaged at the display system exit pupil 24 with a magnification governed by the hologram position and focal length. Furthermore, the packaging restraints of an aircraft cockpit are very restrictive and a small cathode ray tube size is highly desirable. The resultant optical systems shown herein typically operate at speeds between F/1 and F/2.

Figure 2:
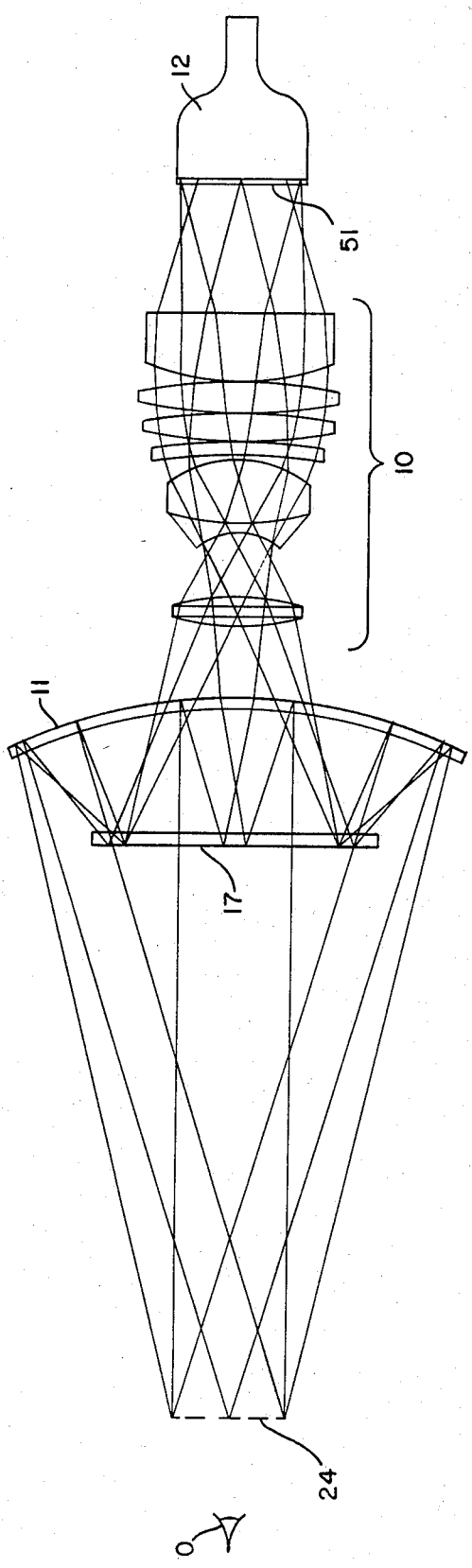
FIG. 2 is an optical schematic view taken on the line 2—2 of FIG. 1 so as to provide a horizontal section of the relay lens portion of the system.
Figure 3:
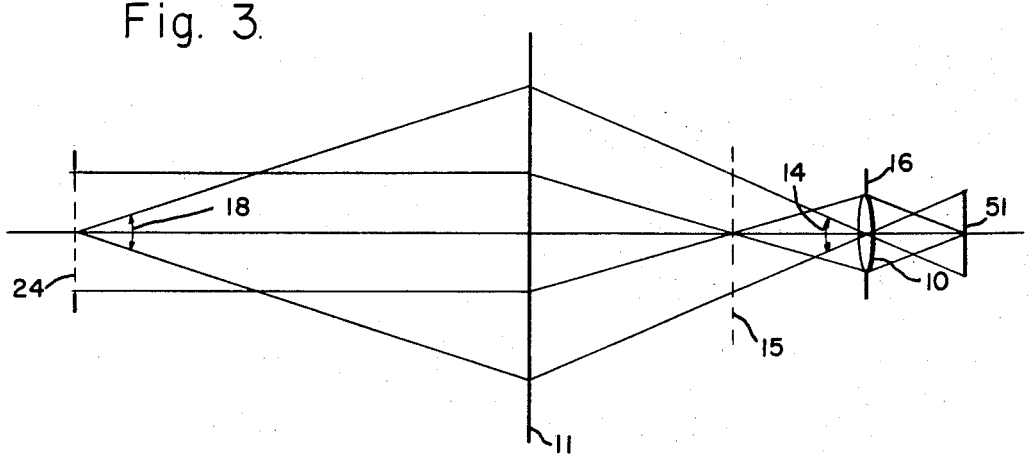
FIG. 3 is a paraxial optical layout of the holographic head-up display.

A paraxial optics layout of the display system shown in FIGS. 1 and 2 is shown in FIG. 3. To keep the optical system short and minimize the size of the relay lens system 10, the focal length of hologram 11 must be as short as possible. The hologram F-number is then in the region of F/2, and the relay lens pupil (defined by the aperture stop 16) is smaller than the display exit pupil 24. In consequence, the relay lens requirements are for (a) magnification of between 1 and 2, (b) an effective F-number of between 0.75 and 1.2, and (c) a field angle 14 subtended by the intermediate image 15 at the relay lens exit pupil in aperture stop 16 of from 35 to 55 degrees. This is because the relay lens pupil is imaged at the display system exit pupil 24 with a magnification governed by the hologram positions and focal length.

Figure 4:
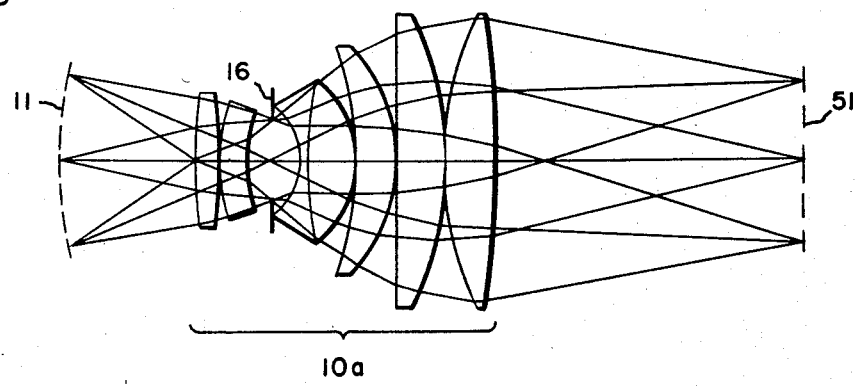
FIGS. 4, 5, 6 and 7 are respectively four different rotationally symmetric relay lens design forms suitable for use in the holographic head-up display system and shown before tilting or decentering. In all cases, the intermediate image is to the left and the object surface (CRT) is to the right of the figures.
Figure 5:
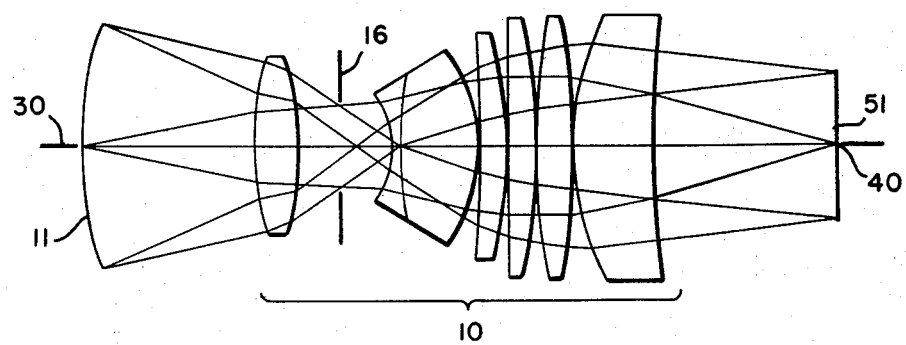

To meet these stringent requirements, four new relay lens design forms have been developed and are shown in schematic detail in FIGS. 4, 5, 6 and 7. The system shown in FIG. 5 is the basis of that of FIGS. 1–3 but does not yet include the tilting and decentering. All four design forms are asymmetric to accomodate the wide field and have a majority of the optical elements on the cathode ray tube side of the aperture stop 16. In all cases, this group of elements consists of (1) negative power close to the aperture stop for control of the Petzval sum, the surface facing the intermediate image 15 being sharply curved to avoid excessively high angles of incidence which would otherwise occur due to the wide field of view, and (2) a positive lens group of three or more positive elements which contain most of the optical power. All designs also show a curved focal surface 21 at the intermediate image as required to match field curvature of the hologram. While spherical lenses have been shown, it will be understood that aspherics could be used. It will further be understood that the lenses could be achromatized.

Considering again the preferred exemplary embodiment shown in FIGS. 1, 2 and 3, it will be noted that the object surface 51 of the cathode ray tube 12 is imaged by the relay lens system 10 to form an intermediate image 15 at and coinciding with the focal surface 21 of the holographic combiner 11 which is positioned in the line of view of the observer O through the aircraft canopy 22. This is facilitated by interposing a folding prism 17 in the optical path to fold or reflect the image of object surface 51. A mirror can equally well be used to fold the optical path. However, a folding prism can serve to also reduce the CRT tilt for ease of packaging. The optical design characteristics of this typical diffraction optics HUD is given in Table I below.

TABLE I

| OPTICAL DESIGN CHARACTERISTICS OF THE HOLOGRAPHIC HUD DESIGN TO FIT A TYPICAL COCKPIT GEOMETRY | | |
|---|---|---|
| Characteristics | Horizontal | Vertical |
| FOV, Degrees | 35 | 22 |
| EXIT PUPIL, inch | 3.5 | 3.2 |
| OBJECT HEIGHT, inch | 3.5 | 1.76 |
| SYSTEM EFL, inch | | 5.550 |
| SYSTEM f-number* | | 1.171 |
| HOLOGRAM EFL, inch | | 9.65 |
| HOLOGRAM f-number* | | 2.036 |
| EYE RELIEF, inch | | 22.00 |
| RELAY EFL, inch | | 2.752 |
| RELAY PUPIL DIAGONAL, inch | | 3.704 |
| EFFECTIVE RELAY f-number* | | 0.743 |
| RELAY MAGNIFICATION | | 1.739 |

*Corresponding to diagonal of the rectangular exit pupil

The limitations imposed by an existing cockpit size were the driving forces in the establishment of these characteristics.

Firstly, the CRT diameter had to be set at 3.5 inches, establishing the system F-number of 1.2 corresponding to the 4.74 inch diagonal of the exit pupil and the 35 degree horizontal FOV. Ejection, canopy and cowling line clearances establish the 50 degree bend angle 25 and the 9.6" hologram focal length. The combination of the resulting hologram F-number and the system F-number then demands a relay lens to cover 44 degree FOV at F/0.74. This is a severe requirement but illustrates the dramatic implications of the cockpit limitations on the optical design. The design requirements were further aggravated because good image quality had to be maintained over the top and bottom portions of the pupil as well as the central region. The aberrations out in the corners of the pupil area are thus as important as those in the central regions being the opposite to most optical design situations in which some performance degradation at the edges of the pupil can often be tolerated.

The resulting preferred embodiment shown in FIGS. 1 and 2 shows that the relay lens design requirements led to the selection of a rather bulky, asymmetric relay lens design form, the initial rotationally symmetric form of which is shown in FIG. 5. In its rotationally symmetric form, the lens has aberrations which correspond to one or two milliradians throughout the FOV at the display exit pupil. However, when incorporated with the holographic lens and the wedged folding mirror 17 to reduce the CRT tilt, the relay lens elements must be tilted and decentered to balance the asymmetric aberrations with some loss in performance. Good performance is obtained over the central 25 degrees but it degrades at the extremes of the 35 degree field of view.

The holographic element in a head-up display is used at a large off-axis angle and is constructed with point sources located close to the desired entrance and exit pupils to obtain high diffraction efficiency across a wide field of view. As a result, the aberrations in the holographic element are large and not suitable for correction with a rotationally symmetric relay lens because of the lack of symmetry in the hologram. See the prior art cited above for suitable hologram construction techniques. To make the aberrations more amenable to correction by the relay lens the construction beams for the hologram (as taught in the prior art) are aberrated by means of cylindrical lenses in each beam. The principal aberrations are axial coma and crossed (xy) astigmatism, though other significant aberrations are present. In general, these aberrations vary in an unsymmetrical fashion across the field of view. These aberrations can be corrected by the above described tilting and decentering elements in the relay lens, thus removing its rotational symmetry. The preferred embodiment shown in FIGS. 1, 2 and 3 is an example of such a design. This design has been fully tested and has proved very successful.

Figure 8:
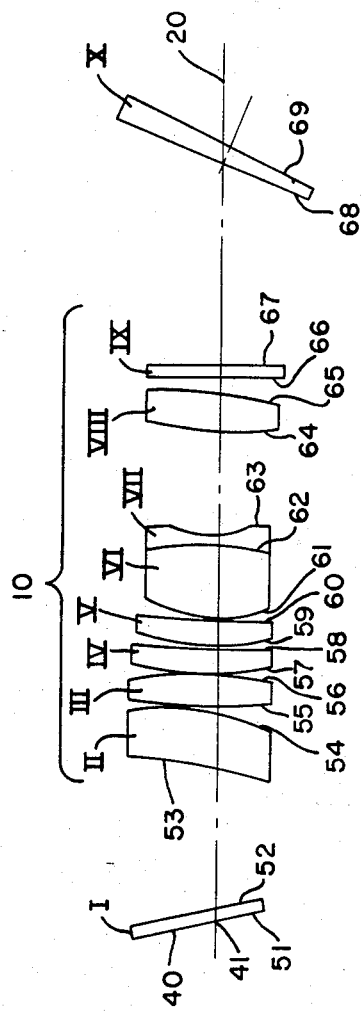
FIG. 8 is an optical schematic view showing the details of the tilting and decentering of the relay lens elements of the design shown in FIGS. 1, 2, 3 and 5.

Further details of the tilting and decentering of the relay lens elements are shown in FIG. 8. In this example, the first and last elements of the relay lens (elements II and VIII) are tilted and decentered relative to all the other relay lens elements. In addition, the first surface of the doublet (elements VI and VII) is tilted. The tilting and decentering of these elements was necessary to correct the aberrations characteristic of the off-axis holographic element.

It will be noted by a comparison of FIG. 8 with FIG. 1 that the order of the elements from left to right is reversed in the two views. That is to say, the object surface 51 of CRT 12 (shown in part in FIG. 8 as element I) is on the right in FIG. 1 whereas it is shown on the left in FIG. 8. It will of course be understood that the system is unaffected by whether one is looking from left to right or right to left and that symmetry in this sense is preserved.

The details of the elements shown in FIG. 8 are identified with respect to an arbitrary reference line 20 because tilting of the lens elements prevents definition of the optical axis of the relay lens system shown in FIG. 8. It will be noted from FIG. 5 that the optic axis 30 of the rotationally symmetric system shown therein intersects the back surface 51 of element I (which is the face plate of CRT 12) at point 40. In FIG. 8 the arbitrary reference line 20 intersects surface 51 at point 41. In the particular preferred embodiment being described, the straight line distance between points 40 and 41 on surface 51 was 0.485".

It will be noted from FIG. 8 that the elements of the optical system are identified in the following manner. Element I is the faceplate of cathode ray tube 12. Elements II, III, IV, V, VI, VII and VIII are the individual glass lens components comprising the relay lens system 10. Element IX is a notch bandpass filter matching the output of the CRT 12. Element X is the folding reflective wedge 17. Element I is indicated as having surfaces 51 and 52, Element II has surfaces 53 and 54, Element III has surfaces 55 and 56 and so on as shown through Element X which has surfaces 68 and 69. It will be noted that surface 62 is common to both elements VI and VII of the doublet. The prescription data for these lens elements is set forth below in Table II. For each surface there is given the radius of curvature, the distance to the next surface or thickness, the index of refraction, the tilt and the decentering. All lenses are glass. Linear dimensions are in inches. Tilt angles are in decimal degrees.

TABLE II

| SURF NO. | RD | TH* | INDEX | TILT** | DEC** |
|---|---|---|---|---|---|
| 51 | ∞ | .250 | 1.517 | 12.496 | 0 |
| 52 | ∞ | 3.503 | AIR | 12.496 | .054 |
| 53 | −34.998 | 1.410 | 1.785 | −9.906 | .731 |
| 54 | −5.687 | .084 | AIR | −9.906 | .488 |
| 55 | 26.795 | .725 | 1.785 | 1.943 | .246 |
| 56 | −19.482 | .050 | AIR | −1.943 | .222 |
| 57 | 13.723 | .656 | 1.785 | −1.943 | .220 |
| 58 | 289.330 | .050 | AIR | −1.943 | .198 |
| 59 | 6.940 | .570 | 1.785 | −1.943 | .196 |
| 60 | 15.616 | .050 | AIR | −1.943 | .177 |
| 61 | 3.355 | 1.834 | 1.607 | −2.728 | .175 |
| 62 | −8.042 | .170 | 1.728 | −1.943 | .113 |
| 63 | 1.926 | 2.625 | AIR | −1.943 | .107 |
| 64 | 5.727 | 1.056 | 1.620 | −6.147 | .478 |
| 65 | −11.880 | .179 | AIR | −6.147 | .365 |
| 66 | ∞ | .250 | 1.517 | 0 | 0 |
| 67 | ∞ | 5.344 | AIR | 0 | 0 |
| 68 | ∞ | .437 | 1.522 | −22.316 | 0 |
| 69 | ∞ | / | / | −26.482 | −.166 |

*Glass thickness are measured along the axis of the first surface of the lens; air thicknesses are measured along line 20.
**Surface tilts and decenters are relative to line 20. Decentration applies prior to tilt. Tilt is specified in angular deviation from the normal to line 20. Decentration is specified along the normal to line 20.

Figure 6:
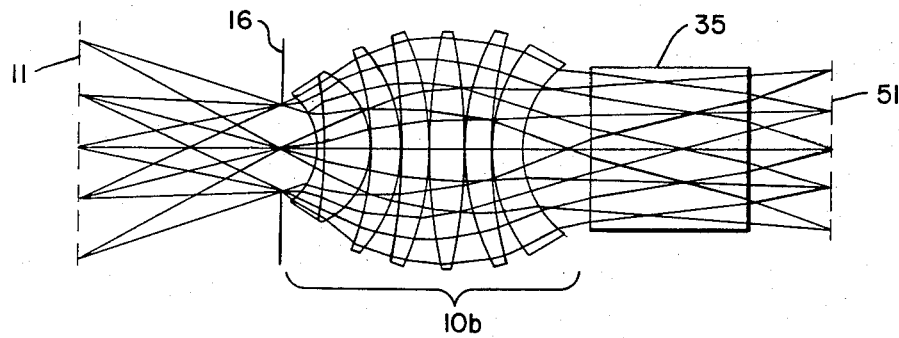
Figure 7:
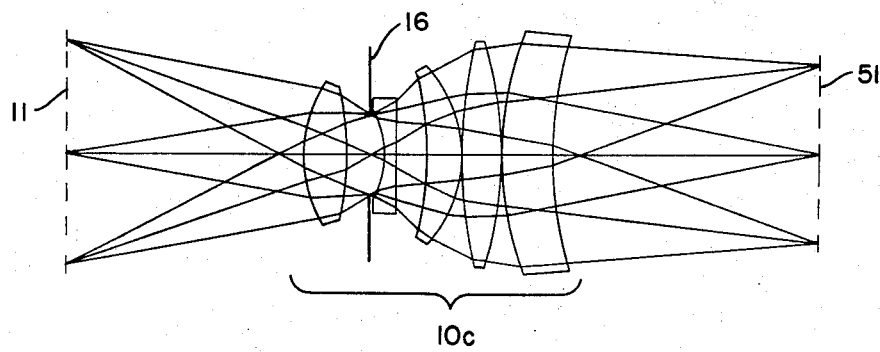

Similar head-up displays can be designed using any of the relay lenses 10a, 10b, or 10c respectively shown in FIGS. 4, 6 or 7 though, given the present state of the art in HOEs, tilting and decentering of lens elements in these designs is also necessary to provide a high quality display. It will of course be understood that the variation shown in FIGS. 4, 6, and 7 are merely suggestive of an innumerable class of lens systems suitable for this purpose all of which are variations on the preferred embodiment shown in FIGS. 1, 2, 3, 5, and 8. The design shown in FIG. 4 is an F/1 system having a 48 degree field of view. The design shown in FIG. 6 is an F/1 system having 50 degree field of view, and the design shown in FIG. 7 is an F/1.2 system having a 40 degree field of view. These are thus four relay lens design forms suitable for holographic head-up display optical systems. In all cases, the intermediate image 15 and hologram 11 are to the left and the object surface of CRT 12 is to the right of the figures.

Holographic head-up displays also frequently require provision for a standby sight which may be incorporated via a beam splitter between the CRT and the relay lens. This provides a fixed image reference pattern (which is often a reticle) for use in case the CRT fails and thus provides an image in the absence of active optical information input from the CRT. This can be done with any of the relay lenses previously discussed. An example has been shown in FIG. 6 where the beam splitter prism 35 is provided between the object surface 51 and the relay lens system 10b. A side benefit of the use of prism 35 is that it may be readily tilted to introduce a large amount of axial coma, thus balancing the coma in the holographic element and reducing the amount of tilting and decentering in the relay lens system 10 and hence reducing its cost and complexity.

It is thus seen that there has been provided an improved integrated optical design for a head-up display system which simultaneously provides an improved field of view and improved means for compensating for hologram aberrations through use of tilted and decentered lenses in a novel type of relay lens systems. This in turn results in decreased size, weight and cost of the improved system.

What is claimed is:

1. In a head-up display system of the type including a source of optical image signal, relay lens means for relaying said optical image signal to a holographic element positioned and used as a combiner lens so that the user may see both said optical image signal projected to said holographic optical element and the external world through said holographic element, optical elements comprising said source of optical image signal (element I), said relay lens means (elements II-VIII), a notch bandpass filter (element IX) and a folding prism (element X), said elements having the following prescription characteristics:

| ELE-MENT | SURF NO. | RD | TH* | INDEX | TILT** | DEC** |
| --- | --- | --- | --- | --- | --- | --- |
| I | 51 | ∞ | .250 | 1.517 | 12.496 | 0 |
|   | 52 | ∞ | 3.503 | AIR | 12.496 | .054 |
| II | 53 | −34.998 | 1.410 | 1.785 | −9.906 | .731 |
|   | 54 | −5.687 | .084 | AIR | −9.906 | .488 |
| III | 55 | 26.795 | .725 | 1.785 | 1.943 | .246 |
|   | 56 | −19.482 | .050 | AIR | −1.943 | .222 |
| IV | 57 | 13.723 | .656 | 1.785 | −1.943 | .220 |
|   | 58 | 289.330 | .050 | AIR | −1.943 | .198 |
| V | 59 | 6.940 | .570 | 1.785 | −1.943 | .196 |
|   | 60 | 15.616 | .050 | AIR | −1.943 | .177 |
| VI | 61 | 3.355 | 1.834 | 1.607 | −2.728 | .175 |
|   | 62 | −8.042 | .170 | 1.728 | −1.943 | .113 |
|   | 63 | 1.926 | 2.625 | AIR | −1.943 | .107 |
| VII | 64 | 5.727 | 1.056 | 1.620 | −6.147 | .478 |
|   | 65 | −11.880 | .179 | AIR | −6.147 | .365 |
| VIII | 66 | ∞ | .250 | 1.517 | 0 | 0 |
|   | 67 | ∞ | 5.344 | AIR | 0 | 0 |
| IX | 68 | ∞ | .437 | 1.522 | −22.316 | 0 |
|   | 69 | ∞ | / | / | −26.482 | −.166 |

*Glass thicknesses are measured along the axis of the first surface of the lens; air thicknesses are measured along an arbitrary reference line 20.
**Surface tilts and decenters are relative to line 20. Decentration applies prior to tilt. Tilt is specified in angular deviation from the normal to line 20. Decentration is specified along the normal to line 20.

* * * * *